(12) United States Patent
Garcia-Franco et al.

(10) Patent No.: US 7,668,946 B1
(45) Date of Patent: *Feb. 23, 2010

(54) TRAFFIC ESTIMATION

(75) Inventors: Jose Carlos Garcia-Franco, Mountain View, CA (US); Taylor Raines, Mountain View, CA (US); Michael F. Kamprath, San Francisco, CA (US); Rob Luenberger, Palo Alto, CA (US)

(73) Assignee: AOL Advertising Inc., Baltimore, MD (US)

( * ) Notice: Subject to any disclaimer, the term of this patent is extended or adjusted under 35 U.S.C. 154(b) by 1442 days.

This patent is subject to a terminal disclaimer.

(21) Appl. No.: 10/231,025

(22) Filed: Aug. 30, 2002

Related U.S. Application Data (60) Provisional application No. 60/316,022, filed on Aug. 31, 2001.

(51) Int. Cl.
  *G06F 15/173* (2006.01)
  *G06F 17/18* (2006.01)
  *G06F 19/00* (2006.01)
(52) U.S. Cl. .................. 709/223; 709/224; 702/179
(58) Field of Classification Search .................. None
  See application file for complete search history.

(56) References Cited

U.S. PATENT DOCUMENTS

| | | | | |
|---|---|---|---|---|
| 5,751,969 | A * | 5/1998 | Kapoor | 709/235 |
| 5,753,809 | A * | 5/1998 | Ogusu et al. | 73/146.2 |
| 6,236,977 | B1 * | 5/2001 | Verba et al. | 705/10 |
| 6,560,204 | B1 * | 5/2003 | Rayes | 370/253 |
| 6,629,138 | B1 * | 9/2003 | Lambert et al. | 709/224 |
| 6,715,005 | B1 * | 3/2004 | Rodriguez et al. | 710/41 |
| 6,721,405 | B1 * | 4/2004 | Nolting et al. | 379/133 |
| 6,810,356 | B1 * | 10/2004 | Garcia-Franco et al. | 702/179 |
| 6,836,800 | B1 * | 12/2004 | Sweet et al. | 709/224 |
| 6,876,988 | B2 * | 4/2005 | Helsper et al. | 706/21 |
| 7,031,932 | B1 * | 4/2006 | Lipsky et al. | 705/14 |
| 7,080,026 | B2 * | 7/2006 | Singh et al. | 705/10 |
| 7,130,808 | B1 * | 10/2006 | Ranka et al. | 705/10 |
| 2002/0169657 | A1 * | 11/2002 | Singh et al. | 705/10 |

* cited by examiner

*Primary Examiner*—John B. Walsh
(74) *Attorney, Agent, or Firm*—Finnegan, Henderson, Farabow, Garrett & Dunner, L.L.P.

(57) ABSTRACT

Methods, systems, and articles of manufacture of the present invention may assist in planning, execution, and evaluation of advertising campaigns on the Internet. Particularly, methods, systems, and articles of manufacture of the present invention may help evaluate and/or predict traffic volume on the Internet. An exemplary method for predicting traffic may comprise receiving historical traffic data for a location, and computing a prediction of traffic volume for a particular time at the location using the historical traffic data and at least one prediction algorithm.

5 Claims, 7 Drawing Sheets

TRAFFIC ESTIMATION

CLAIM FOR PRIORITY

This application claims benefit of U.S. provisional application No. 60/316,022, filed on Aug. 31, 2001, which is expressly incorporated herein by reference.

BACKGROUND

1. Technical Field

The present invention generally relates to predicting traffic volume on the Internet, and more specifically to predicting traffic volume to assist in marketing, planning, execution, and evaluation of advertising campaigns for the Internet.

2. Related Art

The number of users on the Internet continues to grow at an astounding rate while businesses continue to rapidly commercialize its use. As they surf through websites, users generate a high volume of traffic over the Internet. Increasingly, businesses take advantage of this traffic by advertising their products or services on the Internet. These advertisements may appear in the form of leased advertising space on websites, which are similar to rented billboard space in highways and cities or commercials broadcasted during television/radio programs. Experience has shown that it can be difficult to plan, execute, and/or evaluate an advertising campaign conducted over the Internet. Unlike billboards and commercials, there are very few tools (e.g., Nielson ratings, etc.) to accurately measure or predict user traffic on the Internet.

One method for measuring exposure of advertisements posted on a website may be based on daily traffic estimates. This method allows one to control the exposure of an ad and predict the traffic volume (i.e., number of impressions, viewers, actions, website hits, mouse clicks, etc.) on a given site at daily intervals. However, there is no control over how this exposure occurs within the day itself because the method assumes a constant rate of traffic throughout the day. Experience has shown that website traffic typically exhibits strong hourly patterns. Traffic may accelerate at peak-hours, and hence, so does ad exposure. Conversely, at low traffic times, ads may be viewed at a lower rate. These daily (as opposed to hourly) estimates exhibit high intra-day errors, which result in irregular or uneven ad campaigns that are not always favored by advertisers.

Figure 1:
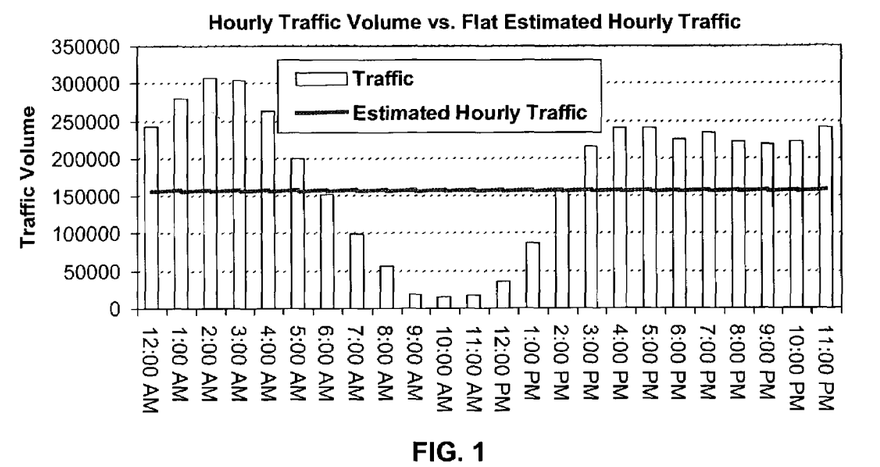
FIG. 1 illustrates an exemplary pattern of under-over-under estimation consistent with the prior art.
Figure 2:
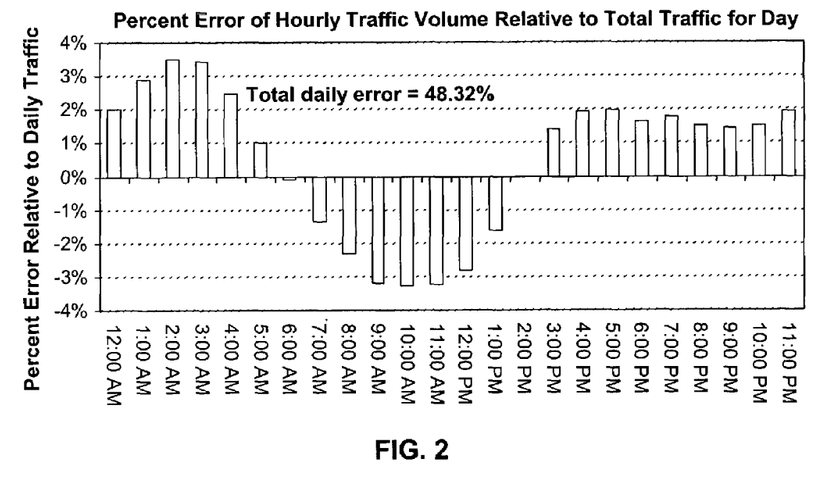
FIG. 2 illustrates exemplary errors in the pattern relative to a day's total traffic consistent with the prior art.

This situation is illustrated in FIG. 1, where a pattern of under-over-under estimation is evident. Traffic volume in the hours of 12:00 am to 5:00 am, 6:00 am to 2:00 pm, and 3:00 pm to 11:00 pm are overestimated, underestimated, and overestimated, respectively. FIG. 2 shows error size for each hour relative to the traffic volume for the entire day. Note that errors tend to average out during the day. However, during times of high relative error, ad campaigns based on a daily traffic estimate tend to accelerate; while at times of low (negative) relative error, these same ad campaigns tend to dramatically decelerate. This situation yields an uneven campaign with "run-away" periods followed by "stalled" periods of exposure.

Campaign unevenness is a symptom of prediction errors (positive or negative). As illustrated in FIG. 2, taking the values of these hourly errors relative to a day's total traffic can give a good indication of the gravity of the campaign's failure to predict intra-day traffic patterns. By summing the absolute value of these relative hourly errors, it is clear that the prediction errors can amount to close to half (48.32%) of the day's total traffic, even though the prediction for the overall daily traffic is accurate. A single hour's prediction error as a percentage of that hour's actual traffic can be much more dramatic. For instance, the hour starting at 9:00 am has a predicted traffic volume of 156,604, but the actual traffic volume is only 15,583, which is an error of 905% for that hour. Similarly for the hours of 1:00 am to 4:00 am, underestimation (per hour) ranges between 40 and 50 percent relative to the actual traffic volume for each respective hour.

Because of the dynamic nature of the Internet, it is difficult to predict the amount of time it will take before advertising goals for a particular advertisement are met. Therefore, it would be beneficial to provide a mechanism to better estimate traffic volume.

SUMMARY OF EXEMPLARY EMBODIMENTS

Methods, systems, and articles of manufacture of the present invention may assist in planning, execution, and evaluation of advertising campaigns on the Internet. Particularly, methods, systems, and articles of manufacture of the present invention may help evaluate and/or predict traffic volume on the Internet.

One exemplary embodiment of the invention relates to a method for predicting traffic. The method may comprise receiving historical traffic data for a location, and computing a prediction of traffic volume for a particular time at the location using the historical traffic data and at least one prediction algorithm.

Additional embodiments and aspects of the invention are set forth in the detailed description which follows, and in part are obvious from the description, or may be learned by practice of methods, systems, and articles of manufacture consistent with the present invention. It is understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Reference is now made in detail to exemplary embodiments of the invention, examples of which are illustrated in the accompanying drawings. Wherever possible, the same reference numbers are used throughout the drawings to refer to the same or like parts.

As discussed above, one method for predicting traffic may estimate a daily traffic volume for a location and use the estimate to compute a constant traffic rate throughout the day. However, other methods (e.g., hour-of-day means method, previous-hour method, previous-hour-plus-drift method, point-slope method, etc.) described below, may also be used to compute traffic predictions using different time intervals, such as with hourly predictions.

One exemplary method for predicting traffic may compute traffic averages for each hour of a day. The hour-of-day means (HDM) method may assume that traffic depends only on the hour of the day regardless of an overall traffic trend at other times of the day. For example, let $x_{i,k}^j$ represent the measured traffic volume of location j during hour k of day i. Assuming $$x_{i,k}^j = v_k^j$$

where $v_k^j$ is a random variable with mean $\mu_k^j$ and variance $(\sigma_k^j)^2$ that describes the traffic volume at location j according to the $k^{th}$ hour (k=0, . . . , 23), the family of $x_{i,k}^j$ for i=1, 2, . . . is then a sequence of independent, identically distributed (i.i.d.) random variables. For illustrative purposes, the following example focuses on a single location. Hence, the superscript j may be dropped from the notation.

Letting $E_{i,k}[.]$ denote an expectation operator conditioned on hour k of day i (i.e., the history of the traffic volume for the location is known up to hour k of day i), the HDM method may then use the expectation as a forecast of the traffic volume for the next hour, which yields $$E_{i,k}[x_{i,k+1}] = E[v_{k+1}] = \mu_{k+1}$$

As one of ordinary skill in the art of traffic estimation can appreciate, for all l less than i, the HDM method may have $$E_{l,k}[x_{i,k}] = \mu_k$$

A traffic volume predictor $\bar{v}_k$ for $\mu_k$ may be constructed using the above results. From a history containing n days of measured traffic volume data, $\bar{v}_k$ may be computed as $$\bar{v}_k = \frac{1}{n} \sum_{i=1}^{n} x_{i,k}$$

for each k=0, . . . , 23. Therefore, in the HDM method, the traffic volume prediction $\hat{x}_k$ at an hour k for any day is given by $$\hat{x}_k = \bar{v}_k$$

which is simply the mean of the measured traffic volume at hour k over a history of n days. The history of n days may be n consecutive or nonconsecutive days.

The variance of the predictor $\hat{v}_k$ is given by $$\text{var}[\bar{v}_k] \frac{\hat{\sigma}_k^2}{n}$$

where $\hat{\sigma}_k^2$ is the estimated variance of the measured traffic volume at hour k over n days and is given by $$\hat{\sigma}_k^2 = \frac{1}{n-1} \left( \sum_{i=1}^{n} (x_{i,k}^2) - n \bar{v}_k \right)$$

Hence, the rate of reduction of the variance of $\bar{v}_k$ (in percentage terms) as the history increases from n to n+1 is $n/(1+n^2)$, or approximately $1/(1+n)$ as n becomes large. This result shows that gaining accuracy in traffic volume prediction may become increasingly difficult after the history grows beyond a certain number of days. Even assuming that hourly means of traffic volume are stationary (i.e., they don't change over time), accuracy in their estimation is limited by available computational resources. Because of the slowdown in the prediction's convergence and the estimated magnitude of the variance for typically measured traffic at a location, a three-month history provided to the predictor $\bar{v}_k$ would give predictions exhibiting up to 20% volatility. Table 1 shows some exemplary results for high traffic locations.

TABLE 1

Volatility comparison

| History Size (days) | Volatility of Prediction (%) |
|---|---|
| 30 | ~20 |
| 60 | ~13 |
| 90 | ~10 |
| 120 | ~10 |

Another exemplary method for predicting traffic may assume that traffic at a location obeys a random walk with zero mean scenario. That is, traffic at a given hour may be predicted by traffic at a previous hour plus a zero-mean, random disturbance. The previous-hour (PrevHr) method can capture the effect of "traffic momentum" (i.e., the momentum of traffic from the previous hour carries over to the next hour). For example, the PrevHr method may assume the following structure $$x_{i,k+1}^j = x_{i,k}^j + \epsilon_k^j$$

where $\epsilon_k^j$ is a random variable with $E[\epsilon_k^j] = 0$ and $\text{var}(\epsilon_k^j) = \sigma_{\epsilon_k^j}^2$.

Limiting the analysis to a single location, superscript j may be dropped from the notation. Using expectation $E_{i,k}[.]$ as a forecast of the traffic volume for $x_{i,k+1}$ and a history of measured traffic volume up to day i and hour k, the following equation is obtained:

$$E_{i,k}[x_{i,k+1}] = E_{i,k}[x_{i,k} + \epsilon_k] = x_{i,k}$$

Therefore, the predicted traffic volume $\hat{x}_{i,k+1}$ at day i and hour k+1 is given by, $$\hat{x}_{i,k+1} = x_{i,k}$$

which is the measured traffic volume at day i and hour k. Note that for any hour m occurring after hour k, this method may predict the traffic volume at hour m to be the last measured traffic volume in the history.

Another exemplary method for predicting traffic may combine recent traffic information (e.g., traffic information from the previous hour) and a history of changes (i.e., drift) in traffic. The previous-hour-plus-drift (PrevHr+) method assumes the changes are of an additive, incremental form and the increments are adjusted according to the hour of the day, which allows the method to accommodate daily patterns observed in historical traffic data. For example, the PrevHr+ method may assume the following structure:

$$x_{i,k+1}^j = \Delta_{k+1} + x_{i,k}^j$$

where $\Delta_k$ is a random variable describing the traffic increment for an hour k of the day. In this equation, the following convention is used: $x_{i,0}^j = \Delta_0 + x_{i-1,23}^j$.

Again, dropping the superscript j and using the expectation as a forecast for the expected traffic volume, the following equation is obtained:

$$E_{i,k}[x_{i,k+1}] = E_{i,k}[\Delta_{k+1}] + x_{i,k}$$

As one of ordinary skill in the art can appreciate, traffic for m hours into the future may be forecasted in a recursive manner. That is, the above equation may be recursively applied to yield $$E_{i,k}[x_{i,k+m}] = \sum_{s=1}^{m} (E_{i,k}[\Delta_{k+s}]) + x_{i,k}$$

using the following conventions: $x_{i-1,24} = x_{i,0}$ and $E_{i,k}[\Delta_{k+s}] = E_{i,k}[\Delta_{mod(k+S,24)}]$. With a traffic history of n days, a traffic increment estimator may estimate the expectation $E_{i,k}[\Delta_k]$ using $$\hat{\Delta}_k = \frac{1}{n-1} \sum_{i=1}^{n} (x_{i,k} - x_{i,k-1})$$

Therefore, the forecast for the expected traffic volume may be rewritten as $$E_{i,k}[x_{i,k+1}] = \hat{\Delta}_{k+1} + x_{i,k}$$

and the predicted traffic volume $\hat{x}_{i,k+1}$ at day i and hour k+1 is then given by $$\hat{x}_{i,k+1} = \hat{\Delta}_{k+1} + x_{i,k}$$

which is the estimated traffic increment at hour k+1 plus the measured traffic volume in the previous hour.

The increment estimator $\hat{\Delta}_k$ may only use the most recent three months of historical traffic data to generate the estimate because using more data may not significantly reduce the variance of the estimate. Using more data may also increasingly expose the estimate to incorrect modeling due to long-term, structural changes in traffic patterns. An increment variance estimator may approximate the variance of $\Delta_k$ using $$\hat{\sigma}_{\Delta_k}^2 = \frac{1}{n-1} \sum_{i=1}^{n} (x_{i,k} - x_{i,k-1} - \hat{\Delta}_k)^2$$

The variance estimator may be useful when the historical traffic data contains extreme traffic volume values or outlying data, as defined below. It is not unusual to encounter extreme values coming from errors or by omission in historical traffic data. For instance, a chain of missing values in the historical traffic data at times where traffic is typically high for a certain location may indicate that there has been some historical data capture problem. Of course, it may also mean that the location became unpopular and that traffic for those times was indeed zero. This type of atypical data is referred to as outlying data. The criteria for deciding between what is legitimate data and what is outlying data is rather subjective. However, traffic volume prediction may be improved if these extreme values are removed or corrected.

In one exemplary embodiment of the present invention, a filter may be used to correct or remove outlying data from the historical data. The filter may employ a criteria that assumes a measured traffic volume at some time (e.g., at day i and at hour k) in the historical data is outlying data when the measured traffic volume at that time lies more than $N_d$ standard deviations from the mean of the measured traffic volume at hour k over a history of n days. For example, the filter may estimate $\hat{\Delta}_k$ and $\hat{\sigma}_{\Delta_k}^2$ in the manner described above. If a measured traffic volume $x_{i,k}$ meets the following parameters:

$$x_{i,k} > x_{i,k-1} + \hat{\Delta}_k + N_d \hat{\sigma}_{\Delta_k} \text{ or } x_{i,k} < x_{i,k-1} + \hat{\Delta}_k - N_d \hat{\sigma}_{\Delta_k}$$

then the measured traffic volume $x_{i,k}$ may be classified as outlying data and the filter may substitute $x_{i,k-1} + \hat{\Delta}_k$ for $x_{i,k}$ in the historical traffic data. The predicted traffic volume may then be calculated using the corrected data as previously described.

Figure 3A:
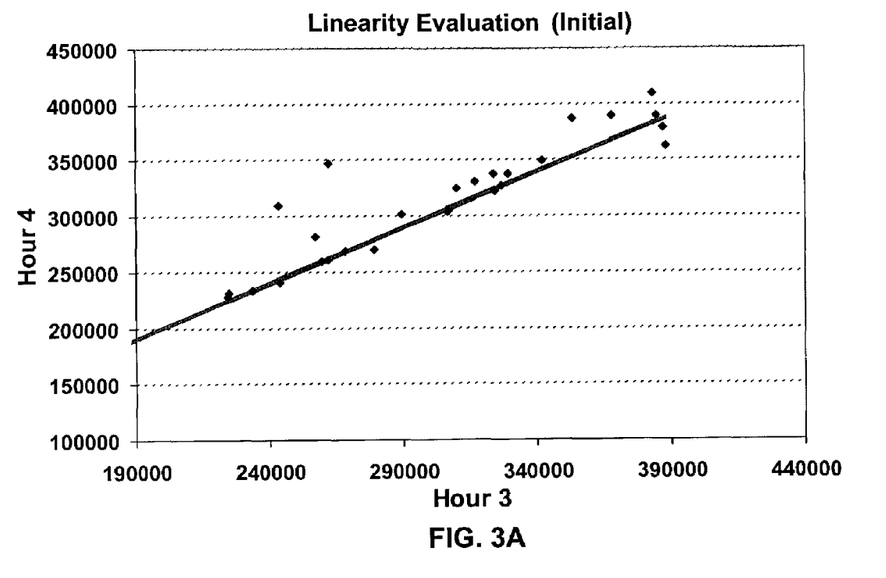
FIGS. 3A and 3B illustrate exemplary linear relationships in hourly traffic consistent with features and principles of the present invention.
Figure 3B:
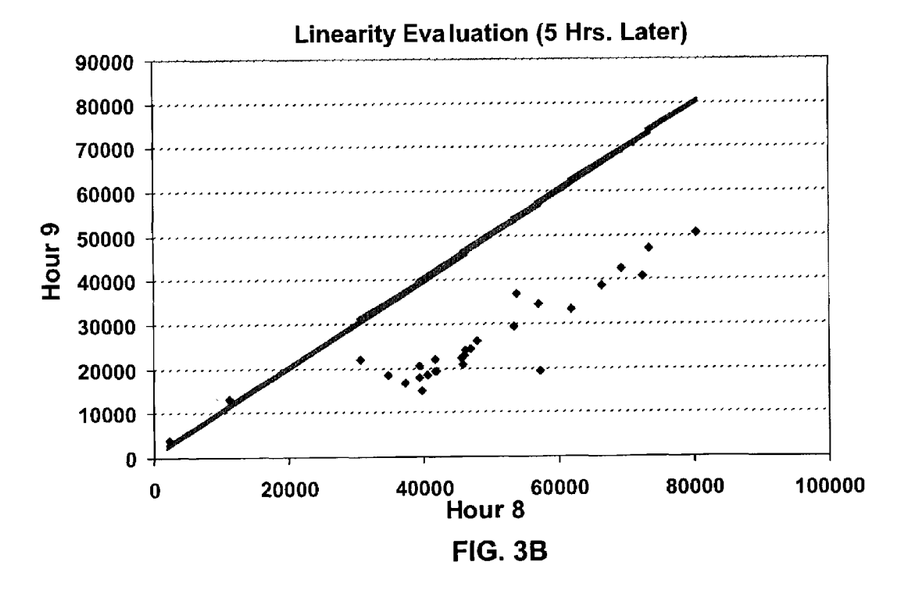

Another exemplary method for predicting traffic may add another degree of freedom to the PrevHr+ method because the explanatory impact of recent traffic may vary according to the time of day in addition to a time-of-day dependent, additive shock. This method may assume a linear relationship between $x_{i,k}^j$ and $x_{i,k+1}^j$, and hence, is called the point-slope method. FIG. 3A shows an example of the linear relationship. It plots the measured traffic volume at the third hour versus the fourth hour of each day in February, 2001 at a test location. The plot shows the measured traffic volumes of the third and fourth hour form a linear pattern. This pattern may be found at most locations, but the strength and form of the linear relationship varies by hour and across locations. For example, FIG. 3B shows a similar relationship five hours later at the same location for the eighth and ninth hours, but while the relationship is still fairly linear, it significantly differs in slope (the solid line represents a 45-degree line in both FIGS. 3A and 3B). In general, for most locations, the relationship between traffic at subsequent hours is linear enough to justify using the point-slope method as a first-order approximation.

From the above observations, the point-slope method may assume the following structure:

$$x_{i,k+1}^j = a_{k+1}^j + b_{k+1}^j x_{i,k}^j + \epsilon_{k+1}^j$$

where $a_k^j$ is a mean hour-of-day additive increment, $b_k^j$ is a constant or a loading for the hour prior to hour k, and $\epsilon_k^j$ is a random variable (i.e., noise term) with zero mean (i.e., $E_{i,k}[\epsilon_{k+1}] = 0$) at location j and hour k. Focusing on one location (i.e., dropping superscript j), using the expectation as a forecast for the expected traffic volume, and recognizing that $E_{i,k}[x_{i,k}] = x_{i,k}$, the following equation is obtained:

$$E_{i,k}[x_{i,k+1}] = a_{k+1} + b_{k+1} E_{i,k}[x_{i,k}] + E_{i,k}[\epsilon_{k+1}]$$

$$= a_{k+1} + b_{k+1} x_{i,k}$$

Traffic for more distant times in the future may be forecasted in a recursive manner. More specifically, a forecast for traffic volume m hours after the hour k may be given by $$E_{i,k}[x_{i,k+m}] = \sum_{h=1}^{m}\left(a_{k+h}\prod_{s=h+1}^{m}b_{k+s}\right) + \prod_{h=1}^{m}b_{k+h}x_{i,k}$$

As one of ordinary skill in the art can appreciate, the point-slope method, discussed above, uses a linear regression with $x_{i,k}$ as regressand and $x_{i,k-1}$ as regressor. The coefficients $a_k$ and $b_k$ may not be directly observable from the historical traffic data, but they may be estimated using, for example, a least squares method. The least squares method may estimate $a_k$ and $b_k$ by minimizing a sum of squared errors $$\sum_{i=1}^{n}e_{i,k}^{2} = \sum_{i=1}^{n}\left(x_{i,k} - \hat{a}_k - \hat{b}_k x_{i,k-1}\right)^2$$

where $e_{i,k}$ is a prediction error between a predicted traffic volume at hour k of day i and the measured traffic volume at hour k of day i. Using first-order conditions to minimize $$\sum_{i=1}^{n}e_{i,k}^{2},$$

the point-slope method may solve for coefficients $\hat{a}_k$ and $\hat{b}_k$ to yield $$\hat{b}_k = \frac{\sum_{i=1}^{n}(x_{i,k}x_{i,k-1}) - n\bar{x}_k \bar{x}_{k-1}}{\sum_{i=1}^{n}(x_{i,k-1})^2 - n\bar{x}_{k-1}^2}$$

$$\hat{a}_k = \bar{x}_k + \hat{b}_k \bar{x}_{k-1}$$

where $$\bar{x}_k = \frac{1}{n}\sum_{i=1}^{n}x_{i,k} \text{ and } \bar{x}_{k-1} = \frac{1}{n}\sum_{i=1}^{n}x_{i,k-1}$$

with the convention $x_{i,-1} = x_{i-1,23}$. We may substitute the coefficient estimates for the coefficients $a_k$ and $b_k$ in the expected traffic volume forecast, and the predicted traffic volume $\hat{x}_{i,k+1}$ at day i and hour k+1 is then given by $$\hat{x}_{i,k+1} = \hat{a}_{k+1} + \hat{b}_{k+1}x_{i,k}$$

In one exemplary embodiment, the hourly traffic predictions from any of the HDM, PrevHr, PrevHr+, and point-slope methods may be combined to predict the traffic volume for a location (e.g., a website) over a period of time comprising $m_Z$ hours. Using the point-slope method as an example, let $\hat{x}_{i,k+1,z}$ represent the predicted traffic volume for hour k+1 of day i in time niche z. Then, $\hat{x}_{i,k+1,z}$ may be calculated using $$\hat{x}_{i,k+1,z} = \hat{a}_{k+1} + \hat{b}_{k+1}x_{i,k}$$

From the previous results for $E_{i,k}[x_{i,k+m}]$, the traffic volume m hours after hour k of day i at a location may be calculated using $$\hat{x}_{i,k+m} = \sum_{h=1}^{m}\left(\hat{a}_{k+h}\prod_{s=h+1}^{m}\hat{b}_{k+s}\right) + \prod_{h=1}^{m}\hat{b}_{k+h}x_{i,k}$$

If $H_Z$ is a set of hours k+m, then the predicted traffic volume for a location during the $H_Z$ hours may be calculated by $$\hat{d} = \sum_{k+m \in H_Z}\hat{x}_{i,k+m}$$

which is simply the sum of the individual hourly traffic volume predictions for the time defined by $H_Z$.

In general, the point-slope method may provide consistently accurate traffic volume predictions, but when the measured traffic volume contains structural traffic changes (e.g., outlying data), the method may "blow up" (i.e., yield extraordinarily large predictions). The traffic volume predictions may be filtered to prevent the blow ups using mathematical functions, distributions, or other criteria. For example, one embodiment of the present invention may construct a test statistic filter $f(\hat{x}_{i,k})$ such that $$f(\hat{x}_{i,k}) = \begin{cases} 1; & \text{if } \bar{x}_k - t_c\hat{\sigma}_k \leq \hat{x}_{i,k} \leq \bar{x}_k + t_c\hat{\sigma}_k \\ 0; & \text{otherwise} \end{cases}$$

where $t_c$ is a threshold estimate, $\bar{x}_k$ is the estimated mean of the measured traffic volume at hour k over n days, and $\hat{\sigma}_k$ is the estimated standard deviation of the measured traffic volume at hour k over n days. Table 2 shows the exemplary critical values of $t_c$ corresponding to the number of days n that may be used to compute the predicted traffic volume $\hat{x}_{i,k}$. The $t_c$ values in Table 2 are based on a student-t distribution cumulative density function (c.d.f.) with a 99% cumulative probability criterion, but as one of ordinary skill in the art can appreciate, the values of $t_c$ may be based on any other statistical/mathematical function (e.g., discrete function, continuous function, Poisson c.d.f., binomial c.d.f., etc.) with any other criterion.

TABLE 2

| Critical values of $t_c$ | |
| --- | --- |
| n | $t_c$ |
| <20 | 2.878 |
| 21 | 2.861 |
| 22 | 2.845 |
| 23 | 2.831 |
| 24 | 2.819 |
| 25 | 2.807 |
| 26 | 2.797 |
| 27 | 2.787 |
| 28 | 2.779 |
| 29 | 2.771 |
| 30 | 2.763 |
| 31 | 2.756 |
| 32 | 2.750 |
| 33 to 42 | 2.704 |

TABLE 2-continued

Critical values of $t_c$

| n | $t_c$ |
|---|---|
| 43 to 62 | 2.660 |
| 63 to 122 | 2.617 |
| >122 | 2.576 |

One exemplary embodiment of the present invention may use filter $f(\hat{x}_{i,k})$ to measure whether $\hat{x}_{i,k}$ is believable based on historical traffic data. A problem with this is that if a permanent regime or behavioral change occurs in a traffic pattern, then past traffic data may become irrelevant. In spite of this, filter $f(\hat{x}_{i,k})$ may be used to indicate whether a location's traffic pattern is stable enough for the point-slope method to be effective. If this is not the case, then when $f(\hat{x}_{i,k})$ is zero, one embodiment may revert to other methods (e.g., HDM method, PrevHr method, etc.) that may not blow up in the face of pattern changes.

Table 3 uses various exemplary predictability scores to compare the performance of the HDM, PrevHr, PrevHr+, and point-slope methods in predicting traffic volume at a test location for a period from Feb. 1, 2001 to Feb. 28, 2001.

TABLE 3

Location A from Feb. 1, 2001 to Feb. 28, 2001 Total traffic = 92,407,331 impressions (total traffic volume)

| | Daily Mean | HDM | PrevHr | PrevHr+ | Point-Slope |
|---|---|---|---|---|---|
| Mean Error | 3,396 | (7,705) | 123 | 103 | (347) |
| Standard Dev. | 89,496 | 33,252 | 35,301 | 18,323 | 16,262 |
| Maximum Error | 239,809 | 175,126 | 186,993 | 146,510 | 144,192 |
| Minimum Error | 26 | 1 | 21 | 14 | 4 |
| Normalized L1 Score | 47% | 15% | 17% | 7% | 6% |

The predictions were computed using a 90-day sliding window of historical traffic data (i.e., when calculating the prediction for each hour of the day, only the most recent 90 days of traffic data were used). The comparison is made in terms of hourly prediction errors, where each method observed (i.e., recorded in the historical traffic data) the traffic volume for the last 90 days up to hour k of day i and computed a prediction $\hat{x}_{i,k+1}$ for the next hour's traffic based on the observation. Each method continued predicting the traffic volume for the subsequent hour as the previous hour of traffic volume was observed. Then, from the prediction and the measured traffic volumes the prediction errors $e_{i,k}$ were computed, as defined by $$e_{i,k} = x_{i,k} - \hat{x}_{i,k}$$

The predictability scores in Table 3 were calculated using $$\bar{e} = \frac{1}{24n} \sum_{i=1}^{n} \sum_{k=0}^{23} e_{i,k} \text{ (mean error)},$$

$$\sigma_e = \frac{1}{24n-1} \sum_{i=1}^{n} \sum_{k=0}^{23} (e_{i,k}^2 - 24n\bar{e}^2) \text{ (standard deviation)},$$

$$e_{max} = \max_{\{i,k\}} |e_{i,k}| \text{ (maximum error)},$$

$$e_{mn} = \min_{\{i,k\}} |e_{i,k}| \text{ (minimum error), and}$$

$$L1 = \frac{\sum_{i=1}^{n} \sum_{k=0}^{23} |e_{i,k}|}{\sum_{i=1}^{n} \sum_{k=0}^{23} x_{i,k}} \times 100\% \text{ (normalized } L1 \text{ score)}$$

Although the above lists the mean error, standard deviation, maximum error, minimum error, and normalized L1 score as possible predictability scores, other metrics (e.g., total traffic, etc.) may be used as a predictability score.

From Table 3, we can see that the PrevHr+ and the point-slope methods are among the best performers. The point-slope method in particular exhibits the lowest standard deviation and maximum error. The prediction method selected may depend on a user's objectives and willingness to trade-off error mean and variance. Table 3 also shows that the point-slope model has the lowest normalized L1 score. This may come at the expense of a higher mean error. However, this mean error may be orders of magnitude below what a method using daily means (instead of hourly predictions) would yield.

Predictability scores may provide a good criterion for selecting a method of predicting traffic based on a desired smoothness in deployment of an ad campaign. A smoothly deployed ad campaign exposes users to advertisements at a predictable pace. Hence, a smooth ad campaign may use a method that accurately predicts traffic volume. In contrast, an unsmoothly deployed ad campaign exposes users to advertisements unpredictably or even haphazardly until the exposure reaches a predetermined level that signifies the end of the campaign.

Figure 4A:
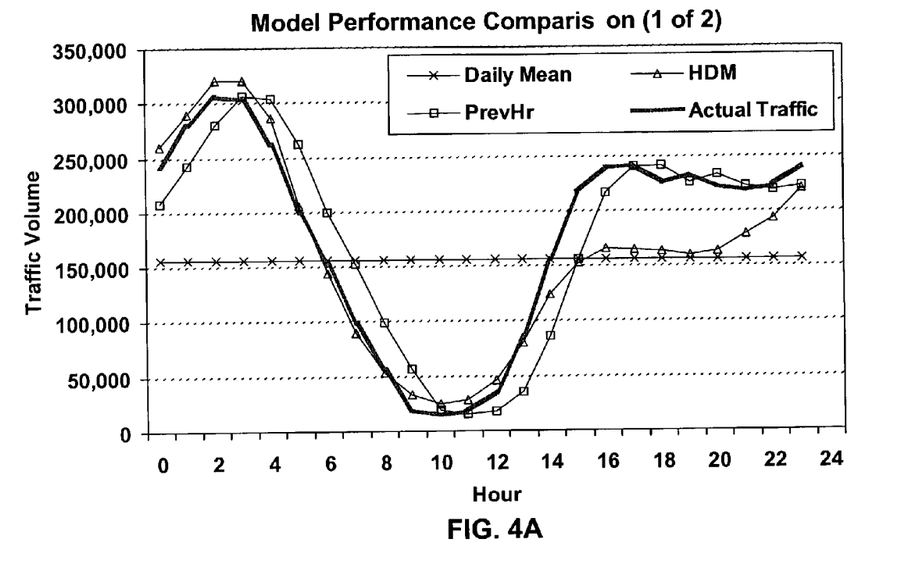
FIGS. 4A and 4B compare the performance between various exemplary prediction methods consistent with features and principles of the present invention.
Figure 4B:
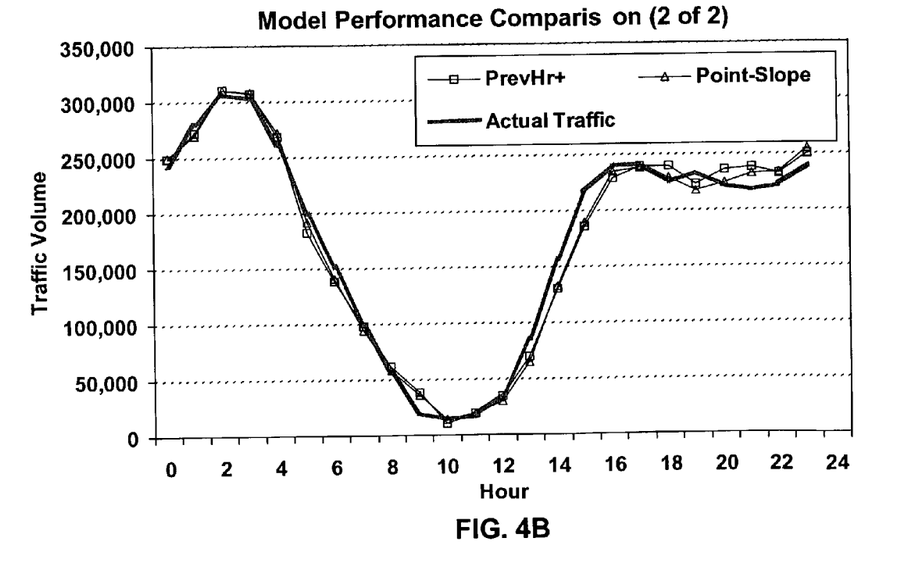

FIGS. 4A and 4B provide a visual perspective of the relative effectiveness of the different methods. The figures show the hourly traffic predictions of each method and the actual traffic for the test location on February 18, 2001. The methods with better predictability scores seem to deliver more accurate predictions because their predictions match the later observed traffic volume more closely than the methods with worse predictability scores. In these figures, it is also easy to see some of the characteristics and possible limitations of each method.

A predictability score gives a measure of the size of a method's prediction error for an analyzed time period. That is, it may give a measure of a location's traffic predictability and may be used to compare the predictability of different locations. This is an important criterion when seeking smooth campaigns because it provides a comparison metric across different locations. The predictability score may be used for campaign decision-making. Campaigns with a high smoothness priority may deliver ads at locations based on the knowledge that the locations with a better predictability score may be more predictable and are likely to deliver smoother campaigns. Note that a first location's predictability score may be better than a second location's predictability score if the first score is lower or higher than the second score.

For example, consider the normalized L1 score in Table 4 for a second location B during the month of February. Compared with the performance results in Table 3, the location for Table 4 may be deemed less predictable because its normalized L1 score using the point-slope model is 12%, which is lower than the score (6%) for Table 3's location. However, the second location has less total traffic (i.e., 8,962,345 impressions) than the first location (i.e., 92,407,331 impressions). In general, lower traffic locations may be less predictable, so a predictability score based on total traffic would be better if it is higher.

TABLE 4

Location B from Feb. 1, 2001 to Feb. 28, 2001 Total traffic = 8,962,345 impressions (total traffic volume)

|  | Daily Mean | HDM | PrevHr | PrevHr+ | Point-Slope |
|---|---|---|---|---|---|
| Mean Error | (1,003) | 3,203 | (26) | (27) | 344 |
| Standard Dev. | 5,851 | 4,049 | 2,862 | 2,396 | 2,263 |
| Maximum Error | 15,482 | 15,309 | 11,292 | 8,907 | 8,578 |
| Minimum Error | 1 | 8 | 4 | 4 | 6 |
| Normalized L1 Score | 32% | 27% | 15% | 12% | 12% |

Figure 5:
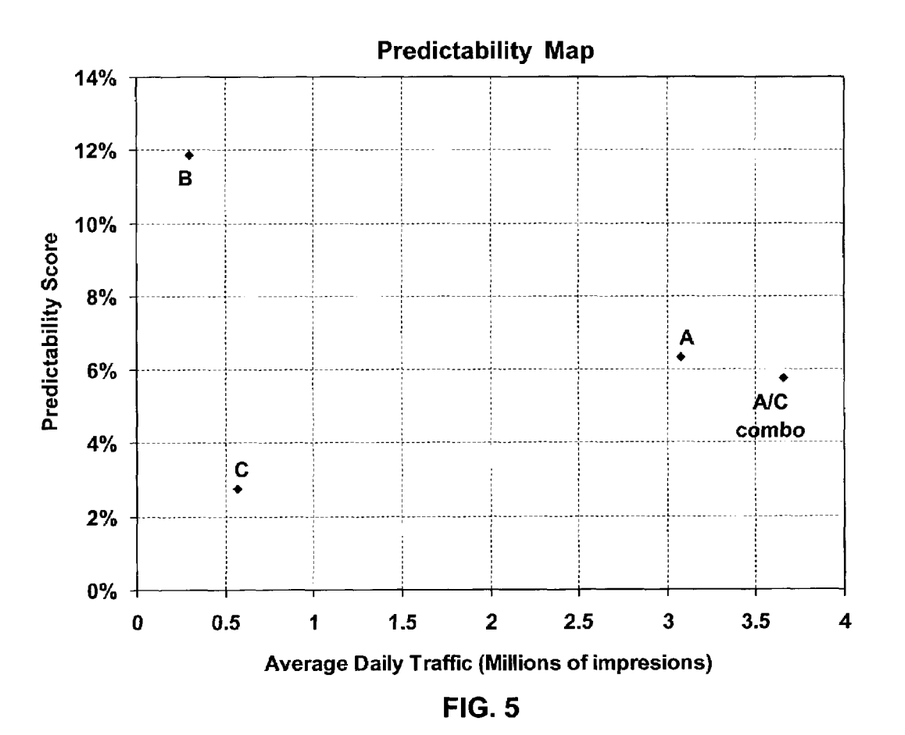
FIG. 5 illustrates an exemplary predictability map consistent with features and principles of the present invention.

It may be better to direct smoothness-sensitive campaigns towards locations with a better predictability score. Generalizing this idea, we can form a predictability map that compares how safe (in terms of smoothness) a location is relative to other locations. FIG. 5 illustrates an exemplary predictability map consistent with features and principles of the present invention. The map plots a predictability score, such as the L1 score, against the average daily traffic volume for three test locations. Although the predictability map in FIG. 5 is a scatter plot, one of ordinary skill in the art can appreciate that the predictability map may take the form of a contour plot, bar graph, line graph, or any other type of graph. From the map, location C appears to be a better target for a smoothness-sensitive campaign than location B because of its lower L1 score. However, we may target a group of locations for an ad campaign. The predictability score $PR_G$ of the group of locations may then be calculated using $$PR_G = \frac{\sum_{j \in G} T_j PR_j}{\sum_{j \in G} T_j}$$

where G is a set of all locations j in the group, $T_j$ is location j's total traffic per unit of time (i.e., day), and $PR_j$ is the predictability score of location j.

For example, using the map in FIG. 5, we can advertise an ad at both locations A and C to fulfill an ad campaign with less expected prediction error than if we only advertised at location A. Further, we do not need to target a campaign equally towards each location in the group. We can use various combinations of locations in order to meet both desired traffic volume and predictability requirements.

Figure 6:
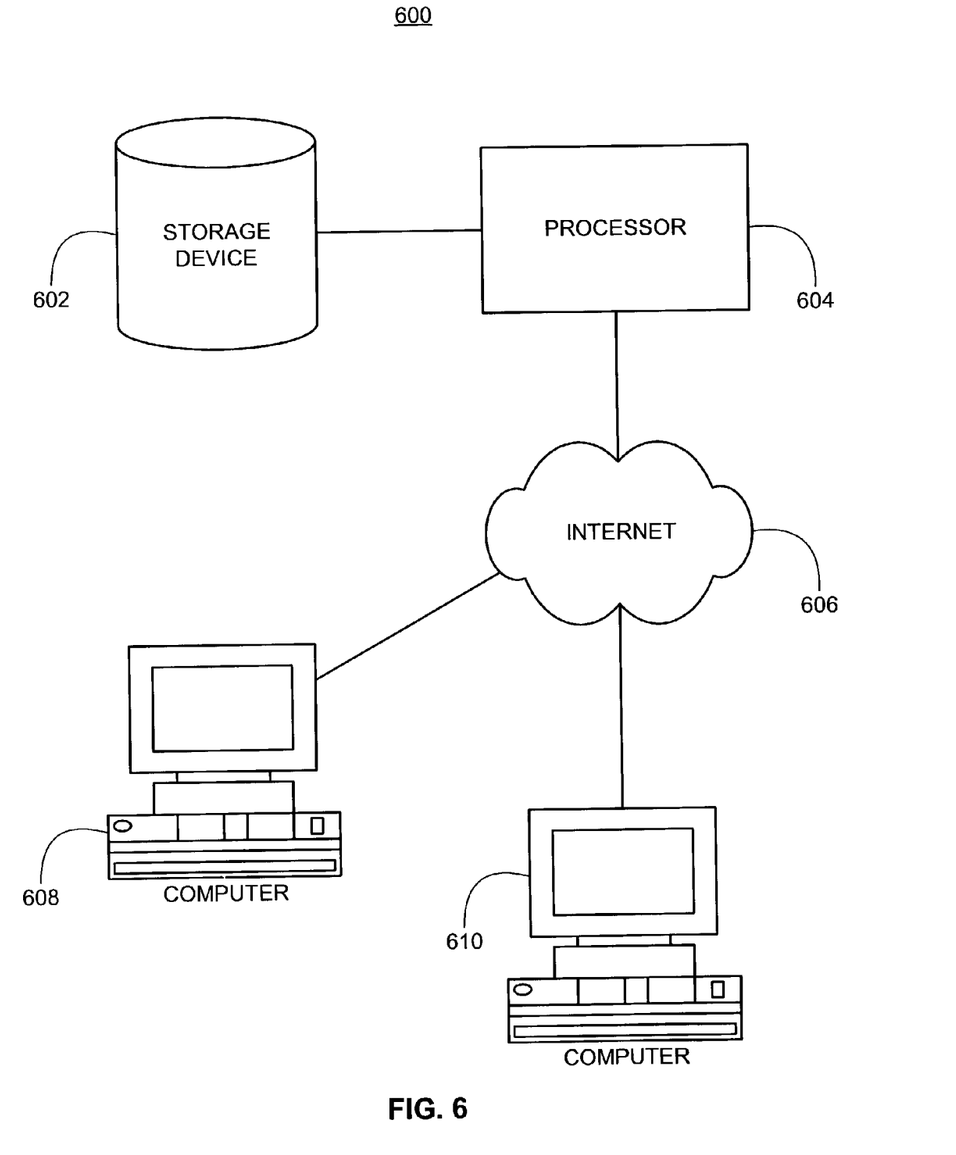
FIG. 6 illustrates an exemplary system for predicting traffic consistent with features and principles of the present invention.

According to features and principles of the present invention and as illustrated in FIG. 6, an exemplary system 600 for predicting traffic may include a storage device 602, a processor 604, a network 606, a computer 608, and a computer 610. Processor 604 may be coupled to storage device 602 and network 606. Network 606 may be coupled to computers 608 and 610. Storage device 602 may be implemented using hard drives, floppy disks, ROM, RAM, and/or any other mechanisms for saving data. Processor 604 may be implemented using computers, application-specific integrated circuits, CPUs, and/or any other device that is capable of following instructions and/or manipulating data. Network 606 may be implemented via the Internet, wide area networks, local area networks, telephone networks, and/or any other mechanism that can facilitate remote communications. Computers 608 and 610 may be personal computers, desktops, mainframes, and/or any other computing device.

Figure 7:
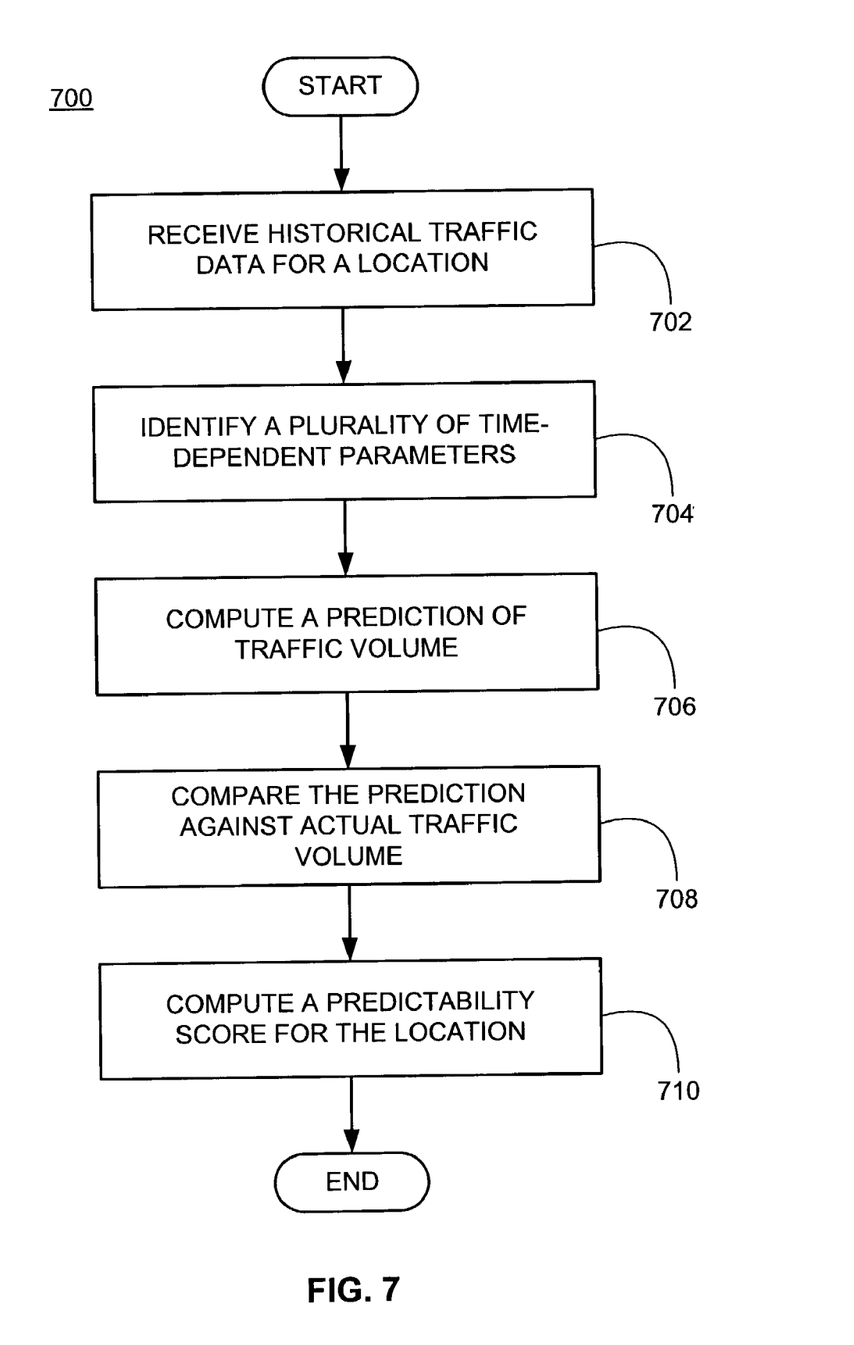
FIG. 7 illustrates an exemplary method for predicting traffic consistent with features and principles of the present invention.

According to features and principles of the present invention, system 600 may be configured to implement exemplary method 700, illustrated in FIG. 7, for predicting traffic. Processor 604 may receive historical traffic data for a location (step 702). The historical traffic data may be stored on storage device 602. Historical traffic data may include any information about previous traffic volume at the location. If the location is a website on network 606, the historical traffic data may include a number of visitors to the website via computers 608 or 610, a number of hits at the website, a number of impressions at the website, and/or any other data about the website for various times of the day.

Particularly, the historical traffic data may include observations of the traffic volume $x_{i,k}$ at the website at each hour k of day i for any number of days. The observations may be made by processor 604, counters at the website, or any other mechanism. Besides websites, the location may be any other place where traffic passes through or attendance can be measured and/or observed. For example, a location may be a highway, a street, a television channel, a radio station, or any other place where traffic information is obtainable.

Consistent with features and principles of the present invention, processor 604 may identify one or more time-dependent parameters based on the historical traffic data (step 704). For example, processor 604 may estimate the parameters $\hat{a}_k$, $\hat{b}_k$, $\hat{x}_k$, $\hat{x}_{i,k}$, $\hat{x}_{i,k,z}$, $\hat{\sigma}_k$, $\hat{\sigma}_k^2$, $\hat{\Delta}_k$, $d_z$, $\bar{x}_k$, $e_k$, or other time-dependent parameters using historical traffic data. Processor 604 may estimate the time-dependent parameters using ordinary least squares or other methods, as previously described.

Processor 604 may compute a traffic volume prediction (step 706), consistent with features and principles of the present invention. The prediction may be computed using any of the methods discussed herein and it may be the predicted traffic volume for the next hour, day, time niche, or other time period. Processor 604 may then compare the prediction against actual measured traffic volume data (step 708). The actual traffic volume data may reflect visits, hits, etc. by users at a location (e.g., website) via computers 608 or 610. In one embodiment, processor 604 may make the comparison by calculating elk.

Consistent with features and principles of the present invention, processor 604 may then compute a predictability score for the location (step 710). The predictability score may be a normalized L1 score, a mean error, a maximum error, a minimum error, or any other metric. When $e_{i,k}$ is calculated, the computed predictability score may also be based on $e_{i,k}$.

Additionally, processor 604 may perform steps 702 to 710 to compute a predictability score of another location. System 600 may execute an ad campaign based on the predictability scores of the two locations using an exemplary method 800 illustrated in FIG. 8. For example, processor 604 may compare the predictability scores of the two locations (step 802) and generate a predictability map (step 804). From the predictability map and/or the predictability scores, processor 604 may select one of the two locations, a group comprising the two locations, and/or a larger plurality of locations for an advertising campaign (step 806). Processor 604 may conduct an advertising campaign at the selected location(s) by sending or placing advertisements at the locations (step 808). If the locations are websites, then processor 604 may display advertisements on the websites.

Figure 8:
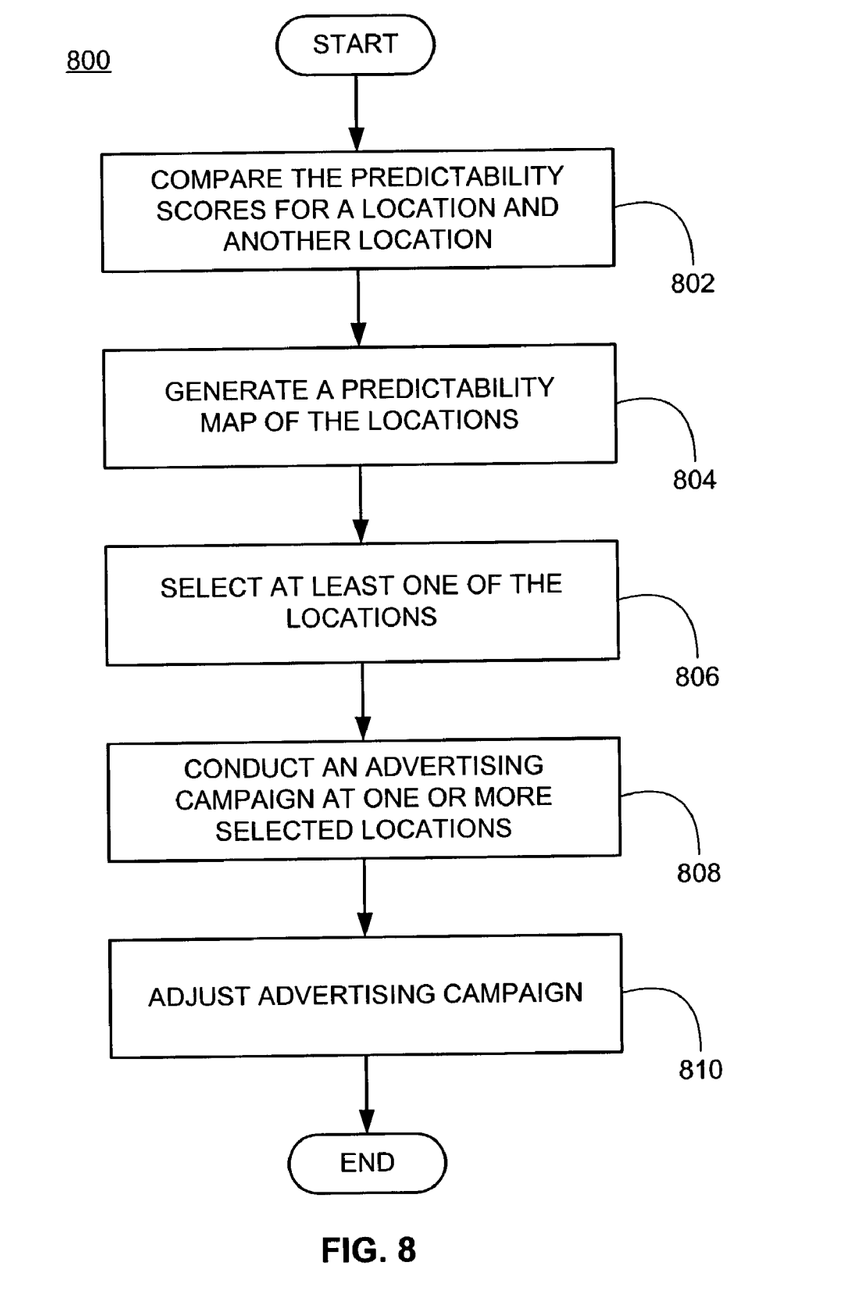
FIG. 8 illustrates an exemplary method for conducting an ad campaign consistent with features and principles of the present invention.

According to features and principles of the present invention, during the life of the ad campaign, processor 604 may adjust an advertising schedule of the ad campaign (step 810) to compensate for differences or variances between predicted and actual traffic. The advertising schedule may include the planned times and locations where processor 604 intends to place ads, as determined in steps 802 to 806. As an ad campaign progresses, processor 604 may predict the traffic volume at various locations for a window of W days (e.g., processor 604 may predict the traffic volume for multiple hours at a website, as previously discussed). Processor 604 may then use the predictions to adjust the advertisement delivery schedule within the time window.

In the foregoing description, various features are grouped together in various embodiments for purposes of streamlining the disclosure. This method of disclosure is not to be interpreted as reflecting an intention that the claimed invention requires more features than are expressly recited in each claim. Rather, as the following claims reflect, inventive aspects may lie in less than all features of a single foregoing disclosed embodiment. Thus, the following claims are hereby incorporated into this description, with each claim standing on its own as a separate embodiment of the invention. Furthermore, as used herein, the words "may" and "may be" are to be interpreted in an open-ended, non-restrictive manner.

What is claimed is:

1. A method comprising:
   receiving historical traffic data for a location;
   computing, by a computer system comprising one or more processors, a prediction of traffic volume for a particular time at the location using the historical traffic data and at least one prediction algorithm;
   receiving observed traffic volume data from the location;
   comparing the computed prediction against the observed traffic volume data;
   computing, by the computer system, a predictability score for the location from the comparison;
   comparing the predictability score for the location with a predictability score of another location; and
   generating an advertising campaign based on at least one of the predictability scores.

2. The method of claim 1, further comprising:
   generating a predictability map of the locations based on at least the comparison of the predictability scores for the locations.

3. The method of claim 1, further comprising:
   selecting at least one of the locations based on at least the comparison between the predictability scores; and
   conducting the advertising campaign at one or more of the selected locations.

4. A system, comprising:
   one or more processors configured to receive historical traffic data for a location, compute a prediction of traffic volume for a particular time at the location using the historical traffic data and at least one prediction algorithm, receive observed traffic volume data from the location, compare the computed prediction against the observed traffic volume data, compute a predictability score for the location from the comparison, compare the predictability score for the location with a predictability score of another location, and generate an advertising campaign based on at least one of the predictability scores.

5. A recording medium readable by a processor, wherein the recording medium comprises:
   instructions for one or more processors to receive historical traffic data for a location, compute a prediction of traffic volume for a particular time at the location using the historical traffic data and at least one prediction algorithm, receive observed traffic volume data from the location, compare the computed prediction against the observed traffic volume data, compute a predictability score for the location from the comparison, compare the predictability score for the location with a predictability score of another location, and generate an advertising campaign based on at least one of the predictability scores.

\* \* \* \* \*

UNITED STATES PATENT AND TRADEMARK OFFICE
CERTIFICATE OF CORRECTION

PATENT NO. : 7,668,946 B1  Page 1 of 1
APPLICATION NO. : 10/231025
DATED : February 23, 2010
INVENTOR(S) : Garcia-Franco et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2031 days.

Signed and Sealed this

Seventh Day of December, 2010

David J. Kappos
*Director of the United States Patent and Trademark Office*